United States Patent Office 3,661,847
Patented May 9, 1972

---

3,661,847
CARBORANE-SILOXANE POLYMERS
Dwain R. Chapman, Midland, Mich., assignor to Dow Corning Corporation, Midland, Mich.
No Drawing. Filed May 1, 1969, Ser. No. 821,105
Int. Cl. C08f 11/04
U.S. Cl. 260—46.5 E         16 Claims

ABSTRACT OF THE DISCLOSURE

Siloxane polymers having haloalkyl substituents and a carborane linkage in the polymer backbone provide heat stable fluids, resins and elastomers. A specific polymer $$HO \left[ \begin{array}{c} CH_3 \\ | \\ Si-CB_{10}H_{10}C \\ | \\ CH_2 \\ | \\ CH_2 \\ | \\ CF_3 \end{array} \right] \left[ \begin{array}{cc} CH_3 & CH_3 \\ | & | \\ SiO & SiO \\ | & | \\ CH_2 & CH_2 \\ | & | \\ CH_2 & CH_2 \\ | & | \\ CF_3 & CF_3 \end{array} \right]_x H$$

can be compounded with silica to form an elastomer which is stable at temperatures of 600° F. and greater.

---

This invention relates to novel siloxane polymers containing a carborane linkage in polymer unit. In one aspect, the invention relates to carborane-siloxane polymers containing halohydrocarbon substituents attached to the silicon atom. In another aspect the invention relates to the condensation of bis(alkoxy-perfluoroalkyl-alkyl) - neocarborane with bis(chloro-perfluoroalkyl-alkyl) - neocarborane in the presence of certain acid catalyst.

Certain carborane-siloxane polymers, such as $$\mathrm{\{-(CH_3)_2SiCB_{10}H_{10}Si(CH_3)_2O-\}}$$

are disclosed in the literature, for example U.S. Pat. 3,388,090. These known polymers are made by the condensation of bis(halosilyl)-neocarboranes with bis(alkoxysilyl)-neocarboranes in the presence of ferric chloride as a catalyst. Exemplary is the following reaction:

$$\xrightarrow{FeCl_3} \left[ \begin{array}{cc} CH_3 & CH_3 \\ | & | \\ Si-CB_{10}H_{10}CSi-O \\ | & | \\ CH_3 & CH_3 \end{array} \right]_n$$

The instant invention provides a carborane-siloxane polymer in which the silicon atom contains a perfluoroalkylethyl substituent. These polymers exhibit enhanced thermal stability and solvent resistance properties.

In accordance with the invention there are provided siloxane polymers containing at least one unit of $$\left[ \begin{array}{c} R \\ | \\ Si \\ | \\ R' \end{array} \left( \begin{array}{c} R \\ | \\ OSi \\ | \\ R' \end{array} \right)_n CB_{10}H_{10}C \left( \begin{array}{c} R \\ | \\ SiO \\ | \\ R' \end{array} \right)_m \begin{array}{c} R \\ | \\ SiO \\ | \\ R' \end{array} \right]$$

in which each R is independently selected from the group consisting of alkyl radicals containing from 1 to 12 carbon atoms or a R' radical; R' is a perfluoroalkylethyl radical of no more than 12 carbon atoms; $n$ is an integer having a value of from 0 to 2 inclusive; and $m$ is an integer having a value of from 0 to 2 inclusive.

As described above R can be any straight or branched chain alkyl radical containing from 1 to 12 carbon atoms, for example, methyl, propyl, butyl, octyl, decyl, or dodecyl radicals.

R' can be any perfluoroalkylethyl radical as represented by —$CH_2CH_2R_f$ wherein $R_f$ is —$CF_3$, —$C_2F_5$, —$C_3F_7$ and so on through $C_9F_{19}$ and $C_{10}F_{21}$ radicals.

The —$CB_{10}H_{10}C$— unit in the polymer is derived from the meta isomer of carborane (i.e., neocarborane) which has the formula $HCB_{10}H_{10}CH$.

Thus, included with the scope of the invention are polymers containing units of the formula:

$$\left\{ \begin{array}{cc} CH_3 & CH_3 \\ | & | \\ Si-O\,Si-CB_{10}H_{10}C-SiO \\ | & | \\ CH_2 & CH_2 & CH_2 \\ | & | & | \\ CH_2 & CH_2 & CH_2 \\ | & | & | \\ CF_3 & CF_3 & CF_3 \end{array} \right\}$$

$$\left\{ \begin{array}{cc} CH_3 & CH_3 \\ | & | \\ Si-OSi-CB_{10}H_{10}C-SiO \\ | & | \\ CH_2 & CH_2 & CH_2 \\ | & | & | \\ CH_2 & CH_2 & CH_2 \\ | & | & | \\ C_3F_7 & CF_3 & C_3F_7 \end{array} \right\}$$

$$\left\{ \begin{array}{cc} C_3H_7 & \\ | & \\ Si-CB_{10}H_{10}C-SiO-SiO \\ | & \\ CH_2 & CH_2 & CH_2 \\ | & | & | \\ CH_2 & CH_2 & CH_2 \\ | & | & | \\ C_7F_{15} & C_7F_{15} & C_7F_{15} \end{array} \right\}$$

$$\left\{ \begin{array}{cc} C_9H_{19} & \\ | & \\ Si-CB_{10}H_{10}C-SiO-SiO \\ | & \\ CH_2 & CH_2 & CH_2 \\ | & | & | \\ CH_2 & CH_2 & CH_2 \\ | & | & | \\ C_5F_{11} & C_5F_{11} & C_5F_{11} \end{array} \right\}$$

$$\left\{ \begin{array}{cc} C_2H_5 & C_2H_5 \\ | & | \\ Si-OSi-CB_{10}H_{10}C-SiO-SiO \\ | & | \\ CH_2 & CH_2 & CH_2 & CH_2 \\ | & | & | & | \\ CH_2 & CH_2 & CH_2 & CH_2 \\ | & | & | & | \\ CF_3 & CF_3 & CF_3 & CF_3 \end{array} \right\}$$

The siloxy-carbonyl polymers of the invention can be prepared by condensation of a neocarborane monomer of the formula $$X-\underset{R'}{\overset{R}{\underset{|}{Si}}}\left(\underset{R'}{\overset{R}{\underset{|}{OSi}}}\right)_n CB_{10}H_{10}O \left(\underset{R'}{\overset{R}{\underset{|}{SiO}}}\right)_m \underset{R'}{\overset{R}{\underset{|}{Si}}}-X$$

in which R, R', $n$ and $m$ are as defined above and in which X is the hydroxyl group or an alkoxy radical containing no more than 6 carbon atoms, for example methoxy or ethoxy radicals. Because of the perfluoroalkylethyl substituents on the silicon atom, the ferric chloride catalyst of the prior art is ineffective—it is necessary that an acid catalyst be utilized. These acid catalysts are selected from the group consisting of sulfuric acid, sulfonic acid and the following sulfonic acid derivatives; methanesulfonic, ethanesulfonic, p-toluenesulfonic, perfluoromethane and tetrafluoroethanesulfonic acids. Conditions of time and temperature can vary but condensation can generally be effected in 24 hours at 150° C.

The polymers of the invention can also be prepared by the reaction of the above-defined bis(hydroxysilyl)-neocarborane with a bis(aminosliyl)-neocraborne. Bis(hydroxysilylsiloxy) and bis(aminosilylsiloxy) reactants can also be utilized. Ammonia is evolved during the condensation.

The silyl neocarborane precursors and silylsiloxy precursors for the polymers are prepared by reacting the meta isomer (i.e. neocarborane) with an alkali metal alkyl to form the corresponding di(alkali metal) derivative which in turn is reacted with fluoroalkyl-substituted halosilane or a fluoroalkyl substituted disiloxane, of the formula

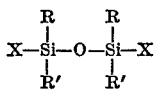

where X is selected from the group consisting of chlorine, bromine, and iodine atoms. The bis(halosilyl)-neocarboranes can be hydrolyzed or reacted with the appropriate alcohol. They can also be reacted with ammonia to form the bis(aminosilyl)-neocarboranes.

Lithium is the preferred alkali metal used in this reaction. Suitable lithium alkyls include methyl lithium, isopropyl lithium, n-butyl lithium and n-amyl lithium. The reaction is preferably carried out in the presence of an inert solvent such as diethylether, methylethyether, dioxane or tetrahydrofuran. Further details of this type of monomer preparation are set forth in U.S. Pat. 3,366,656 and U.S. Pat. 3,397,221.

Dilithioneocarborane can also be reacted with cyclic siloxane to produce certain of the monomers. For example, $LiCB_{10}H_{10}CLi$ can be reacted with $$\{CF_3CH_2CH_2(CH_3)SiO\}_3$$

to yield the lithium-endblocked monomer, having $n+m$ equal to 1 to 4 which in turn can be reacted with water or a dichlorosilane to produce a diol or chlorosilane suitable for condensation. The preparation of monomers via reaction with cyclic siloxane is described in detail in the examples.

The compositions of the invention can be homopolymers containing the same or different carborane-siloxy units, or they can be copolymers containing the above described units and units of the formula

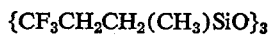

where $a$ has a value of from 0 to 3 inclusive. These included siloxy units are of the type $SiO_2$, $ZSiO_{3/2}$, $Z_2SiO$ and $Z_3SiO_{1/2}$. The same or different Z groups can be bonded to the same silicon atom. In the copolymers Z can be a hydrogen atom, a hydroxyl group, a hydrolyzable group or any organic radical attached to the silicon atom through an Si—C linkage. The "hydrolyzable group" as defined with respect to Z is taken to mean a group which is removed from the silicon atom by reaction with water at room temperature. Exemplary of such groups are halogen atoms; such as fluorine, chlorine, and bromine; hydrocarbonoxy groups such as methoxy, ethoxy, octadecyloxy, allyloxy, cyclohexyloxy, phenoxy, tolyloxy, benzyloxy —OCH$_2$CH$_2$OCH$_3$ and

acyloxy groups such as acetoxy, propionyloxy, benzoxyloxy, cyclohexyloxy, and

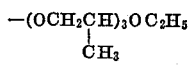

ketoxime groups such as —ON=C(CH$_3$)$_2$ and

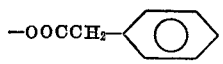

amine groups such as —NH$_2$—N(CH$_3$) and

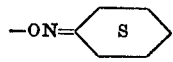

sulfide groups such as —SCH$_3$ and

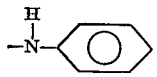

the nitrile group, the isocyanate group, sulfate groups such as

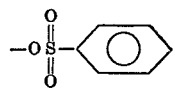

carbamate groups such as —OOCNHCH$_3$,

—OOCH(CH$_3$)$_2$ and —OOCN(C$_2$H$_5$)$_2$ and groups such as —ON(CH$_3$)$_2$ and —ON(C$_3$H$_7$)$_2$.

Z can also be any monovalent hydrocarbon radical such as alkyl radicals, for example, methyl, ethyl, isopropyl, t-butyl, octadecyl, myricyl; cycloaliphatic radicals, for example, cyclohexyl, cyclopentyl and cyclohexenyl; aromatic hydrocarbon radicals for example, phenyl, xenyl and naphthyl; aralkyl hydrocarbon radicals such as benzyl, betaphenylethyl and beta-phenylpropyl; an alkenyl radical, for example, vinyl, allyl, hexenyl, butadienyl or other unsaturated groups including CH≡C—.

In addition, Z can be a halohydrocarbon radical in which the halogen is chlorine, bromine, or iodine such as chloromethyl gamma-chloropropyl, bromo-octadecyl, chlorocyclohexenyl, 3-chlorobutenyl-4, chlorophenyl, bromoxenyl, tetrachlorophenyl, p-chlorobenzyl, trichloropropyl, iodophenyl, trichloropropyl and 3,3,3-trifluoropropyl.

Also included within the scope of the invention are carborane-siloxanes as described above which have olefin-containing siloxane units, such as

These methylvinylsiloxane units are especially preferred and are usually present in the copolymer in amounts in the range of from 0.1 to 10 mol percent to provide crosslinking sites.

The copolymers are prepared by cohydrolysis to form a prepolymer which is then condensed by addition of the described acid catalyst or they can be prepared by co-condensation of the appropriate monomers without forming the prepolymer. For example, dichloromethylvinylsilane can be co-condensed with C,C'-bis{[hydroxy(3,3,3-trifluoropropyl)methylsiloxy]methyl(3,3,3 - trifluoropropyl)silyl}-neocarborane in the presence of tetrafluorosulfonic acid to produce a carborane-siloxane copolymer containing methylvinylsiloxy units.

The carborane siloxane polymers of the invention are fluids, resins and elastomeric materials, depending upon their degree of polymerization and the nature of any co-polymeric units present. The resins form durable films and can be used as coating compositions. The elastomers have particular utility as sealants in high temperature environments and are highly resistant to swelling by organic solvents. The fluids are useful as stable heat transfer media and in some instances lubricants.

The following examples are illustrative of the invention which is delineated in the claims.

EXAMPLE 1

A typical preparation of C,C'-dilithioneocarborane involved the addition of several grams of activated charcoal to a solution containing 1 lb. of ether and 195 grams (1.34 moles) of neocarborane. The mixture was then filtered to remove impurities. Three moles of butyllithium were added slowly with rapid stirring. After stirring for 2-3 hours at room temperature, the material was then filtered through a nitrogen-filled, fritted glass, closed funnel. The solids were washed twice with 100-200 milliliter portions of hexane. The semi-dry solid was then added to 1-2 lbs. of ether which formed a slurry. The solid $$LiCB_{10}H_{10}CLi$$

can be exposed to or transferred to a flask through high humidity air without excessive danger of fire.

EXAMPLE 2

An ether slurry of dilithioneocarborane, prepared in the manner described above using 28.8 grams (0.2 mole) of neocarborane was added to 107 grams of 3,3,3-trifluoropropylmethyldichlorosilane dissolved in 100 milliliters of ether during a one-hour period. The temperature was maintained at 10–15° C. The solids were filtered out and the ether removed. The residue was distilled to give 58 grams (59% yield) of pure

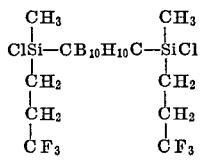

The product had the following properties boiling point 123–125° C./0.1 mm. Hg; $n_D^{25}$, 1.4822; $d_4^{20}$, 1.253. Analysis for chlorine showed the presence of 14.1% (theory 14.37%). The structure was also confirmed by infrared and $H^1$ N.M.R. spectroscopy.

A g.l.p.c. analysis of the distillate indicated an overall yield of 73%. A second reaction starting with 144 grams of neocarborane gave an overall yield of 86%.

Hydrolysis of the above product was accomplished by addition of 100 grams (0.2 mole) of the chlorosilane to a water-acetone mixture. Before work-up the liquid residue was dissolved in hot hexane and upon standing with slow stirring, the solid diol precipitated. The solid product had a melting point of 74–76° C. A yield of 68 grams (75%) was obtained. The compound may be polymorphic as other crystals obtained melted at 84–86° but appeared to be pure diol also as determined by g.l.p.c. infrared, and $H^1$ N.M.R.

EXAMPLE 3

A five gram portion of the diol product of Example 2,

HO(CF$_3$CH$_2$CH$_2$)(CH$_3$)Si—CB$_{10}$H$_{10}$C—
　　　　　　　　　　　　　　Si(CH$_3$)(CH$_2$CH$_2$CF$_3$)OH and 2–4 drops of sulfuric acid were heated for approximately 20 hours at 175–200° C./15 min. Hg. The polymer product,

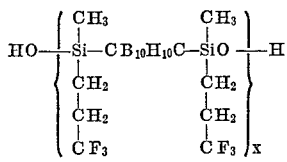

was a light amber hard solid which had some elastic properties. The polymer had a number average molecular weight ($M_n$) of 817 and a weight average molecular weight ($M_w$) of 7,560 as determined by gel permeation chromatography.

A second five gram portion of the diol product of Example 2 was condensed by the addition of 0.1 gram of tetrafluoroethanesulfonic acid and heating for 30 hours at 150–200° C. This polymer was a light amber semi-elastic solid. This product was milled with a small amount of methyltriacetoxysilane and cured at 200° C. The cured product was a resinous film which exhibited a swell of only 18 volume percent in methylisobutylketone.

A third reaction in which 18.2 grams of the diol and 0.11 gram of trifluoropropylvinyldichlorosilane were mixed with the tetrafluoroethanesulfonic acid catalyst and heated for 24 hours at 110° C. gave copolymer which was a waxy solid having a melting point of 72–74° C.

EXAMPLE 4

Methanol was added to 102 grams of the chlorosilane product of Example 2; C,C'-bis{methyl(3,3,3-trifluoropropyl)chlorosilyl}-neocarborane, over a 20 minute period with stirring. The methanol was added in a total amount of 32 grams. Upon distillation of the reaction mixture, 77.3 grams (80% yield) of pure product; C,C'-bis{methyl(3,3,3 - trifluoropropyl)methoxysilyl} - neocarborane was obtained. The structure was confirmed by infra-red and $H^1$ N.M.R. spectroscopy.

An attempt was made to co-condense the above methoxy product with the bis(chlorosilyl)-neocarborane of Example 2 in the presence of ferric chloride as a catalyst. A mixture of 4.81 grams (0.01 mole) of C,C'-bis{methoxy(3,3,3 - trifluoropropyl)methylsilyl} - neocarborane, 4.93 grams (0.01 mole) of C,C'-bis{chloro(3,3,3-trifluoropropyl)methylsilyl}-neocarborane and 0.065 gram of anhydrous ferric chloride (2 mole percent per mole Si) was heated under a nitrogen atmosphere with stirring to 150°C. After heating for some time, there was no apparent reaction and the temperature was raised to 225° C. After several hours of heating there was no increase in the viscosity. A g.l.p.c. analysis showed several components at lower or near the same retention as the starting materials. The g.l.p.c. analysis also indicated a large proportion of the monomers did not react. Four additional attempts were made with no increase in viscosity observed.

Although ferric chloride does act as a catalyst for the reaction of bis(methoxydimethylsilyl)-neocarborane with bis(chlorodimethylsilyl)-neocarborane — see U.S. Pat. 3,388,090—it is apparent from the above attempts that ferric chloride is not effective as a catalyst when the silicon atoms have fluoroalkyl substituents.

EXAMPLE 5

Ammonia gas was bubbled slowly through a mixture containing 500 milliliters of pentane and 25 grams (0.05 mole) of C,C'-bis{methyl(3,3,3-trifluoropropyl)chlorosilyl}-neocarborane. The mixture was then filtered in a nitrogen atmosphere and the filtrate distilled. A distilled yield of 18.7 grams (81.5% yield) of C,C'-bis{amino-(3,3,3-trifluoropropyl)methylsilyl}-neocarborane, was obtained. G.l.p.c. analysis indicated an overall yield of 95%. The structure of the product was confirmed by infrared and $H^1$ N.M.R. spectroscopy.

A mixture of 3.41 grams (7.5 moles) of the above silylamine product and 4.56 grams (0.1 mole) of the diol described in Example 2 was heated at 175° C. for several hours. A nitrogen purge through the reaction flask removed the evolved ammonia. An aspirator vacuum was then attached and heating was continued for a few more hours. The polymer product,

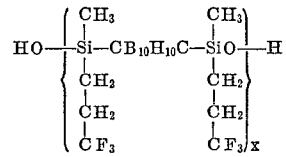

was a light amber elastomeric material. No volatile material was removed from the product after heating to 300° C./0.2 mm. Hg.

A second condensation of the silylamine with a 7% molar excess of the diol gave a low consistency fluid gum.

EXAMPLE 6

The following diol,

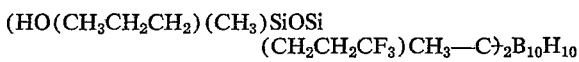

was prepared by reacting the diol of Example 2 with 3,3,3-trifluoropropylmethyldichlorosilane in the presence of pyridene as an HCl acceptor to form the bis(chlorosilylsiloxy)-neocarborane which in turn was hydrolyzed by addition to aqueous acetone.

A mixture of 7.69 grams (10 moles) the above bis-(hydroxysilylsiloxy)-neocarborane and 4.32 grams (9.5 moles) of silylamine of Example 5 was heated under nitrogen purge for 3 hours at 150° C. then for 15 hours at 175° C., and lastly at 200° C. for a few hours. The resulting polymer

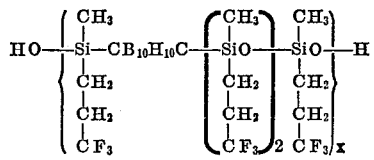

was a highly vsicous, clear fluid.

EXAMPLE 7

A five gram portion of the bis(hydroxysilylsiloxy)neocarbonane of Example 6 was condensed in the presence of tetrafluoroethanesulfonic acid by heating for 24 hours at 200° C. The resulting polymer,

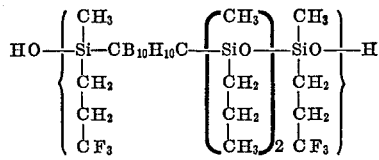

was a very viscous, clear polymer.

EXAMPLE 8

A mixture of 9.13 grams (20 moles) of the diol of Example 2, $(HOSi(CH_2CH_2CF_3)(CH_3)C)_2B_{10}H_{10}$ and 8.89 (19 moles) of cyclic

was heated for several hours at 150° C. under nitrogen purge. The reaction mixture was stripped to remove volatiles. The residue was a viscous fluid polymer of the formula

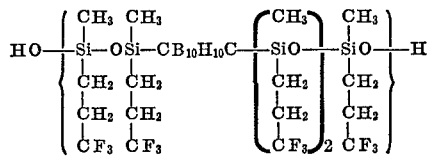

EXAMPLE 9

A dilithioneocarbone slurry was made starting with 29 grams (0.2 mol) of m-carborane. To the slurry was added 62 grams (0.1 mole) of 1,3,5-tris(3,3,3-trifluoropropyl)-1,3,5-trimethylcyclotrisiloxane dissolved in 100 milliliters of ether. The mixture was stirred for two days and then 105 grams (0.5 mole) of (3,3,3-trifluoropropyl)-methyldichlorosilane was added at room temperature over a 30 minute period. The mixture was then filtered and distilled. A number of compounds were isolated having the general structure $Cl(SiP_fMeO)_nSiP_fMeCB_{10}H_{10}CP_fMeSi(OP_fMeSi)_mCl$ where $n=0$, $m=1$ (19%); $n=1$, $m=1$ (27%); $n=2$, $m=1$ (9%).

G.l.p.c. comparison analysis with known compounds also indicated the presence of compounds having the same general structure

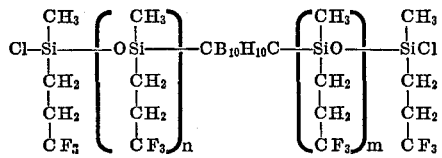

where $n=0$, $m=0$ (9%) and where $n=2$, $m=2$ (5%), in the intermediate fractions and residues. The above yields are approximations based on g.l.p.c. analysis. The overall yield was 70%. The structure, distilled yield (97% pure) and properties of the compounds isolated are listed below.

$n=1$, $m=0$; (16%) boiling 150–155°/0.3 m. Hg. The structure was confirmed by $H^1$ N.M.R. Chlorine analysis was 10.48% (theory 10.91%).

$n=1$, $m=1$; (16%) boiling point 160–166°/0.3 mm. Hg. The structure was confirmed by infrared and $H^1$ N.M.R. analysis. Chlorine analysis was 7.60% (theory 8.79%).

$n=1$, $m=2$; (8.5%) boiling point 128°/0.1 mm. Hg. The structure was confirmed by infrared and $H^1$ N.M.R. spectroscopy. Chlorine analysis was 7.44% (theory 7.37%). A 20 gram (0.025 mole), portion of

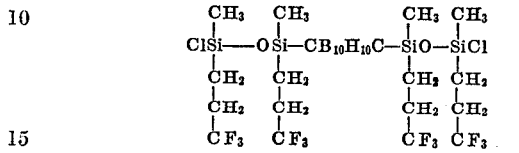

prepared as described above was dissolved in 25 milliliters of acetone. To this was added 18 grams (1.0 mole) of water in 25 milliliters of acetone. After stirring, water and ether were added and the organic layer was washed with water until neutral. The water was removed and benzene was added and the mixture refluxed to remove the last traces of water. Evaporation of the solvents under reduced pressure left a residue products of 14.5 grams (76% yield) of the bis(hydroxysiloxysilyl)neocarborane, which was then condensed in the presence of tetrafluorosulfonic acid to obtain a polymer of the formula illustrated in Example 6.

EXAMPLE 10

A C,C'-dilithiocarborane ether slurry was made by utilizing 195 grams of m-carborane in accordance with the method described in Example 1. This slurry was added to 312 grams of 3,3,3-trifluoropropylmethylsiloxane cyclic trimer which was dissolved in 150 milliliters of ether. After stirring for several hours, 360 grams (1 mole percent) of 3,3,3-trifluoropropylmethyldichlorosilane were added to the reacted mixture. The material was then filtered and hydrolyzed in water. The hydrolyzate was stripped at 225° C./0.3 mm. Hg to remove impurities and volatile material. The hydrolyzate was partially condensed during the stripping operation to give a prepolymer having the general structure:

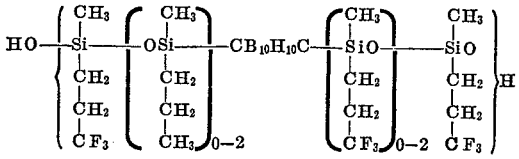

A portion of the prepolymer was mixed with a small amount of methyltriacetoxysilane and cured to an elastomer.

When a condensation catalyst, such as sulfonic acid, is added to the prepolymer and the mixture is further heated, a high molecular weight polymer of the various carborane-siloxy units is obtained.

EXAMPLE 11

A prepolymer was prepared by adding an ether slurry of C,C'-dilithioneocarborane (made from 42 grams of neocarborane) to 178 grams of trifluoropropylmethylchlorodisiloxane in 100 milliliters of ether. After stirring for several hours, the reaction mixture was filtered and the volatiles were removed by stripping to pot temperature of greater than 200° C./0.1 mm. Hg. The residue was hydrolyzed in water, washed neutral, dried and stripped to a pot temperature of 250° C./0.2 mm. Hg to obtain a prepolymer of the structure.

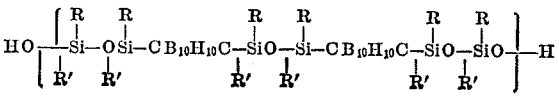

This prepolymer was condensed in the presence of tetrafluoroethanesulfonic acid to obtain a fluid polymer having a viscosity of over 200,000 cps. at 25° C.

EXAMPLE 12

When a mixture containing 95 mol percent of the bis(hydroxysilyl)-neocarborane of Example 2 and 5 mol percent of methylvinyldichlorosilane is heated in the presence of tetrafluoroethanesulfonic acid, there is obtained a copolymer of the following units:

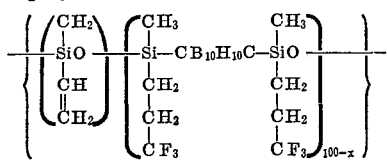

in which $x$ is equal to 1 to 5.

That which is claimed is:

1. A polymer consisting essentially of units of the formula

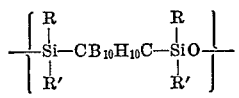

in which
R is an alkyl radical containing from 1 to 12 carbon atoms or a R' radical; and
R' is a perfluoroalkylethyl radical of no more than 12 carbon atoms.

2. The polymer of claim 1 wherein R is a methyl radical and R' is a 3,3,3-trifluoropropyl radical.

3. A polymer consisting essentially of units of the formula

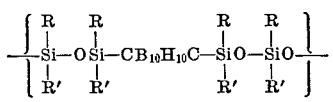

in which
R is an alkyl radical containing from 1 to 12 carbon atoms or a R' radical; and
R' is a perfluoroalkylethyl radical of no more than 12 carbon atoms.

4. The polymer of claim 3 wherein R is a methyl radical and R' is a 3,3,3-trifluoropropyl radical.

5. A polymer consisting essentially of units of the formula

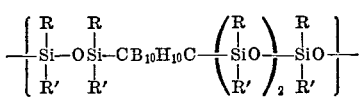

in which
R is an alkyl radical containing from 1 to 12 carbon atoms or a R' radical; and
R' is a perfluoroalkylethyl radical of no more than 12 carbon atoms.

6. The polymer of claim 5 wherein R is a methyl radical and R' is a 3,3,3-trifluoropropyl radical.

7. A polymer consisting essentially of units of the formula

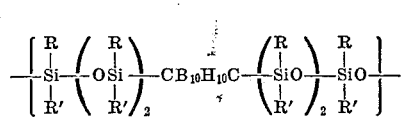

in which
R is an alkyl radical containing from 1 to 12 carbon atoms or a R' radical; and
R' is a perfluoroalkylethyl radical of no more than 12 carbon atoms.

8. The polymer of claim 7 in which R is a methyl radical and R' is a 3,3,3-trifluoropropyl radical.

9. A copolymer consisting essentially of at least one unit of the formula

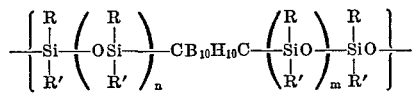

in which
R is an alkyl radical containing from 1 to 12 carbon atoms or a R' radical; and
R' is a perfluoroalkylethyl radical of no more than 12 carbon atoms;
$n$ is an integer having a value of 1 or 2;
$m$ is an integer having a value of from 0 to 2 inclusive;
the remaining units being of the formula

in which
Z is a hydrogen atom, the hydroxy group, a hydrolyzable radical or an organic radical attached to the silicon atom through an Si—C bond; and
$a$ is an integer having a value of from 0 to 3 inclusive.

10. A copolymer in accordance with claim 9 wherein R is a methyl radical and R' is a 3,3,3-trifluoropropyl radical.

11. A copolymer in accordance with claim 9 wherein $n$ is 1 and $m$ is 0.

12. A copolymer in accordance with claim 9 wherein $n$ is 1 and $m$ is 1.

13. A copolymer in accordance with claim 9 wherein $n$ is 1 and $m$ is 2.

14. A copolymer in accordance with claim 9 wherein $n$ is 2 and $m$ is 2.

15. A copolymer in accordance with claim 9 containing from 0.1 to 10 mol percent Z(CH$_2$=CH)SiO— units.

16. The copolymer of claim 15 wherein Z is a methyl radical.

References Cited

UNITED STATES PATENTS 3,542,730 11/1970 Papetti et al. ......... 260—46.5
3,388,092 6/1968 Heyling et al. ......... 260—37

OTHER REFERENCES

Schroeder et al., "The Structure of Neocarborane," Inorganic Chemistry, vol. 2, No. 6, December 1963, pp. 1317–1319.

DONALD E. CZAJA, Primary Examiner

M. I. MARQUIS, Assistant Examiner

U.S. Cl. X.R.

252—49.6 R, 67 R; 260—37 SB, 46.5 G, 448.2 N, 448.8 R, 606.5 B